April 12, 1966  V. HANCOCK  3,245,745
POST-OPERATIVE MULTIFOCAL CATARACT LENSES WITH
BASE-IN PRISMATIC NEAR-VISION SEGMENTS
Filed July 16, 1964  4 Sheets-Sheet 4

INVENTOR
Virgil Hancock
BY Watson, Cole, Grindle & Watson
ATTORNEYS

United States Patent Office 3,245,745
Patented Apr. 12, 1966

3,245,745
POST-OPERATIVE MULTIFOCAL CATARACT LENSES WITH BASE-IN PRISMATIC NEAR-VISION SEGMENTS
Virgil Hancock, Bellaire, Tex., assignor to Textron, Inc., Providence, R.I., a corporation of Rhode Island
Filed July 16, 1964, Ser. No. 383,088
5 Claims. (Cl. 351—167)

This invention relates to eyeglass lenses and more particularly to multifocal lenses adapted to be worn by post-operative cataract patients.

This application is a continuation-in-part of my co-pending application Serial No. 857,683, filed December 7, 1959, now abandoned.

Because of the fact that the crystalline lenses of the eyes of the post-operative cataract patient have been removed by surgery, a spectacle lens of great power must be worn to furnish the added focusing ability to enable the patient to see at a distance satisfactorily. Lenses of such great power are, by virtue of the laws of refraction, necessarily quite thick and heavy.

There has been some prior attempt made to lighten the weight and reduce the thickness of such prescription lenses, but they have not been entirely successful due to a number of resulting defects and disadantages which will be developed as the present specification proceeds.

As a matter af fact, optical grinding-laboratories do not welcome the grinding of any cataract bifocal lens (especially any lenticular cataract bifocal lens) on the market today, because the risk of spoilage of these cataract lenses during the grinding operation is too great; and therefore the grinding-laboratories today look upon a cataract prescription order as a necessary evil which must be accepted in order to receive the simpler non-cataract prescription grinding. The present invention reduces that risk of spoilage, because the segment is embedded within the distance-power lens and anterior to the carrier lens which in reality would enable the grinding laboratory to grind a paper-thin carrier lens without touching the higher-index-of-refraction glass of the segment. For added safety margin, the posterior curve of the present invention's embedded segment could be if desired somewhat concave instead of flat.

The principal object of the present invention is to provide a novel and improved multifocal lens for post-operative cataract patients, whereby the finished lens is thinner and therefore lighter in weight than any similar arrangement heretofore known. At the same time, the novel lens acts to reduce distortion through the reading portion, which distortion has been one of the principal failings of prior lenses for this purpose.

Another object of the invention is to provide means for creating in the segment of the lens, a horizontal prismatic effect with the bases nasalward in order to aid the eyes in converging their axes to the reading material or other close work.

Now it should be understood that a person's eyes may be orthophoric (the eye muscles which turn the eyes in and out being in perfect, relaxed balance) when he looks at an object 20 feet away. When he wants to read at 16 inches, his eyes must turn nasalward to receive the two rays of light emanating from the printed word, and such turning in of the eyes (convergence) requires some extra effort by the internal recti muscles which pull the eyes nasalward. Such effort is measurable in units called "prism-diopters" and indicated by the symbol Δ.

Exophoria is the term applied to a tendency of the eyes to turn outward, if the eye muscles were completely relaxed. The average person can tolerate up to 2Δ of exophoria when viewing at 20 feet away, and not particularly notice any eye fatigue. (2Δ exophoria would mean that, if the eye muscles were completely relaxed, if the right and left eyes were free to wander independently of each other until each eye settled down to at-ease, a single point 20 feet away would appear to be two identical points separated horizontally by almost 5 inches.)

When reading at 16 inches, if the exophoria (inertia or resistance to the turning in of the eyes) is no greater than 7Δ, a person can tolerate that needed extra effort and still see a single printed character on the page with both eyes simultaneously and not be aware of eye fatigue. Should such a borderline exophoric person undergo cataract surgery, he then must wear a high-powered magnifying lens for clear distant vision. For ease of arithmetic, let us use for such a post-operative cataract case a prescription of +10.00 diopters of magnifying power in front of each eye for clear distant vision.

Properly fitted, the optical-centers of his +10.00 distance lenses will coincide with his lines-of-sight when he looks straight ahead at 20 feet. However, when he reads, his eyes must turn in to focus on the printed word, and now his lines-of-sight cut through his +10.00 lenses at a point about 2 mm. (0.2 cm.) nasalward from the distance-optical centers in each lens. Multiplying, per formula, his +10.00 by 0.2 cm. will give 2.00Δ base-out prismatic effect in each eye, a binocular total outward pull on his eyes of 4.00Δ base-out.

Before cataract surgery he was a borderline case as far as eye-fatigue at close-work was concerned. Since surgery, the newly-suffered 4.00Δ base-out has placed him in a category over the line, and, if he doesn't see double, at least he will complain of his eyes getting tired, of sleepiness after brief reading, and of a grayness to black print.

This, then, gives rise to an important object of the invention. The present invention provides for such a person the first available lens to return him to the pre-surgery status of his internal recti muscles, to let him read in comfort for as long a period as was possible before surgery, and at the same time by means of a light-weight, inconspicuous, thinnest possible multifocal lens having its segment designed to present the vertical plane of the anterior surface of its segment more nearly normal to or perpendicular to the incident ray coming from the reading material, an added advantage not possible with the lenticular cataract multifocals heretofore available to him, in which former lenses the ray incident from reading would enter the anterior surface of the reading segment at an angle so sharp as to produce distortion of image.

A further object of the invention is to provide novel methods of making such lenses.

Other objects of the invention will be apparent from the following specification when read in connection with the accompanying drawings in which certain embodiments of the invention are illustrated by way of example.

For a logical development of the disclosures of the present invention, a definition of terms would be in order and also it would appear that a description of prior attempts to solve the problem involved here, would be in order. Therefore, the earlier figures in the attached drawings will be devoted to illustrations of terms and to a delineation of such prior devices.

Certain of the later figures of drawing illustrate certain exemplary embodiments of the practice of the present invention, and taken in connection with the following specification, will suggest further objects and features of novelty of the invention. These figures are for the most part diagrammatic and to a degree somewhat approximate, but the construction and functions depicted will be clearly understood by those skilled in the art.

In the drawings:

FIGURES 19A to 24, inclusive, illustrate prior art practices and point up disadvantages which the present invention is aimed to eliminate;

Occasionally in the optical field two or more different optical terms are used interchangeably, although there really may be a difference in the precise meaning of those different words. To make clear the exact optical conditions described in this specification, it may be helpful first to define precisely what is meant by the following various optical terms as herein used. Thus may be avoided any unintended assumption of the existence of any certain optical condition because of differing definition of the optical terms employed.

The term "segment" is intended to mean the part of a lens which adds magnifying power to one area of a lens. A segment may be an extra piece of glass cemented upon or into one surface of a lens; it may be fused or welded into a depression in one surface of a lens: or it may be buried completely within the major lens. Or, on one surface of a lens, a segment may be a raised area which possesses a radius of curvature different from the radius of the major lens. However, in the present application the segment and its own optical characteristics generally are described as if optically the segment is a separate piece of glass from that of the major lens.

The reading portion, or reading area, as used herein, is that area of a multifocal lens through which the wearer reads, the reading portion being comprised of both the segment and that portion of the major lens coincident with the area of the segment and which contains the segment or upon which the segment is superimposed. An equivalent term to "reading" is "near-vision."

Figure 1:
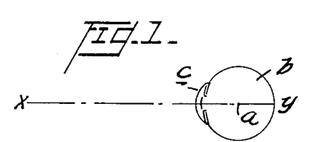
FIGURES 1 to 15, inclusive, are diagrams explanatory of the terms used in the present specification.

The visual axis or line-of-sight is a straight line $x$—$y$ basically drawn from the point $x$ being viewed, (as in FIGURE 1) through the center $a$ of the pupil of the eye $b$, through the center of rotation of the eye (about 13 mm. back of the eye's cornea $c$), to the spot (less than 2 mm. in diameter) on the retina at the back of the eye upon which all central vision, all most acute vision, must focus.

Figure 2:
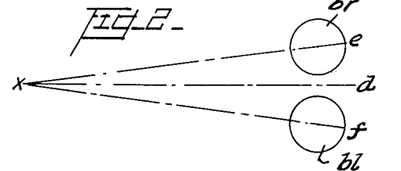

The term "central vision" means the condition where the line-of-sight (especially for reading or close work) coincides with the visual axis, such as must be brought into play when one tries to see most distinctly some fine print held in one's natural close-work or reading position; in binocular cases, usually held in line with the vertical median plane $d$—$x$ of the face, in line with the vertical center-line of the nose, and in monocular cases, frequently in line with the straight-ahead vertical plane of the eye being used, directly in front of the eye doing the reading. In FIGURE 2 the lines-of-sight for central vision are suggested at $e$—$x$ and $f$—$x$ for the right eye $br$ and left eye $bl$, respectively.

Figure 3:
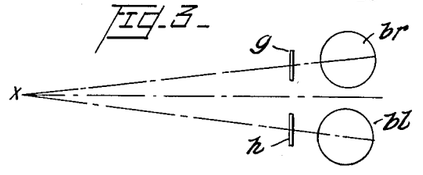

Centered vision is assumed to mean superimposed, coincident right and left vistas or fields-of-view (especially for reading or close-work) placed so that the visual axis or line-of-sight for central vision of each eye passes through the lens equidistant from the right and left boundaries of the lens (herein, the reading portion of the multifocal), and thus (in binocular vision) where the right and left vistas for reading coincide. See FIGURE 3 in which the diagrammatically disclosed lenses $g$ and $h$ are disposed for "centered vision" with respect to the eyes $br$ and $bl$ focused on point $x$.

The term "displacement of segment": ("Displacement" is often erroneously referred to as "decentration" or "decentering" by some opticians). Displacement is the moving of the segment (of a multifocal) toward the nose from the vertical center line of the lens, by whatever is the standard amount needed to furnish centered vision for that wearer with that prescription, according to the standard charts published by Bausch & Lomb (page 79 of "Ophthalmic Lenses, Their History, Theory, and Application"), and by Clark Holmes (page 7 of "Guide to Occupational and Other Visual Needs"). At a reading distance of 16 inches, the charts list the standard displacement nasalward of each segment as being approximately 2 mm. For 9 inches, standard displacement nasalward approximates 3 mm. each segment. With such standard displacement nasalward, the visual axis or line-of-sight of each eye cuts through the optical center of each segment, so that the segment itself will produce *no base-in nor base-out prismatic effect* upon the eyes.

Figures 4, 5:
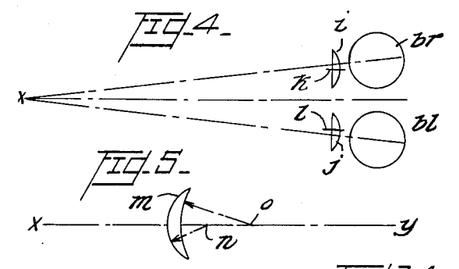

Now, "decentration" is something different. Decentration is the moving of the optical-center of a lens away from that point in the lens through which the visual axis passes in central vision. Herein, decentration refers to the moving of the optical-center of a segment to the right or left of that point in the segment through which the visual axis passes in central vision. See FIGURE 4, wherein the lenses $i$ and $j$ are decentered, having their optical centers $k$ and $l$ moved inwardly.

"Extra seg-displacement" is a term sometimes used by opticians to mean the decentration nasalward of the optical-center of a segment from that point through which the central vision line-of-sight passes, to produce a binocular base-in prismatic effect to help the eyes converge for central vision at close-work.

The optic axis is a straight line drawn to connect the two centers-of-curvature of the two surfaces of a lens. The optical-center of a lens lies upon its optic axis. See FIGURE 5, wherein line $x$—$y$ is the optic axis of lens $m$, passing through the two centers-of-curvature $n$ and $o$.

Figures 6, 7, 8, 9, 14:
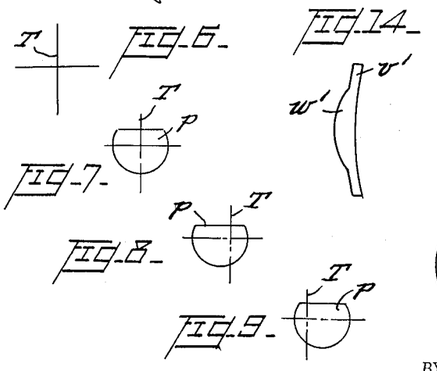

The optical center is the one point in a lens through which a ray of light passes without being displaced or bent and without being subjected to any prismatic effect. See FIGURES 6–9, where FIGURE 6 is a diagram of a visual target T to be observed; FIGURE 7 is a diagram of the target T being viewed through the optical-center of lens segment $p$; FIGURE 8, the target viewed through the lens segment with the center decentered to the left; and FIGURE 9, with the target viewed with the optical-center of the lens segment decentered to the right.

The term "prism" is used to designate a lens having a wedge-shaped profile or, as used in these specifications, that portion of a lens at some point displaced temporally (i.e. toward the wearer's temple) from the optical-center of a segment.

Figure 10:
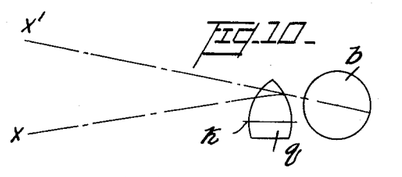

The "prismatic effect" constitutes the bending of a ray of light by a prism toward the thickest point (the base) of a prism: but, to the wearer of a prism, it appears that a prism displaces an object toward the thinnest point (the apex) of the prism. Or, as used in these specifications, the bending effect on a ray of light entering the eye through a point temporally from the optical-center of a segment. See FIGURE 10 in which the object being viewed by the eye $b$ is at $x$, the optical-center $k$ of the prism $q$ displaced as indicated. The apparent position of the object $x$ appears at $x'$.

"Prism-dioptry" (represented by $\Delta$) is the unit of measuring prismatic effect, sometimes called "diopter" (which is the unit for measuring magnifying or minifying power), and sometimes erroneously called "degree" (a "degree" is used in instrument optics, but a 10-degree prism does not bend a ray the same amount as does a $10\Delta$ prism).

Figure 11:
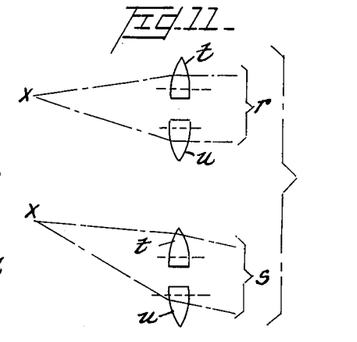

Prism-segment: As used herein, a segment so positioned that central vision passes through the segment temporally from the optical-center, producing a base-in prismatic effect for each eye. As the eyes swing to the wearer's right, the prismatic effect increases through the right segment, but decreases a like amount through the left segment, so that the eyes remain in balance with a constant amount of prismatic effect as the eyes sweep across the page. Thus, in FIGURE 11, the distance or spacing $r$ and $s$ remain the same as the eyes swing with reference to the segments $t$ and $u$.

Figure 12:
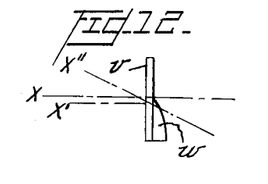

Jump, or "differential displacement": As used in the eyeglass field, "jump" is the difference in the apparent vertical position of an object as viewed through a point in the distance portion of a multifocal immediately adjacent to the top boundary of the reading portion, as compared to the apparent higher vertical position of that object when viewed through a point in the reading portion immediately adjacent to its top boundary. In the present invention "jump" is not noticeable, because the segment's optical-center is placed only about 1 mm. below the segment's top straight-line boundary. See FIGURE 12 where the object $x$ viewed through the distance portion $v$ appears still at $x$ and where the immediately adjacent object $x'$ viewed through the reading portion $w$ appears at $x''$.

Figure 13:
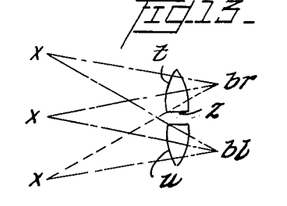

Segment "wall" or "shoulder": As used herein (as viewed from front to back surfaces of a multifocal), the thick nasalward margin of a prism-segment, which produces a ghost-like whitish or shiny "reading-through-a-tube" effect mentally projected toward the reading material. Such a "wall" has resulted from the only way heretofore found to produce a pair of prism-segments which would permit centered vision, superimposed and coincident right and left reading vistas. See FIGURE 13, where such walls in the segments are indicated at $z$.

A feather-edge is a margin or boundary of zero thickness, produced by two intersecting curves.

A lenticular lens portion is the "strong power" portion located centrally in a lens which has a relatively "weak power" larger diameter carrier or supporting portion. A lenticular lens may be a single-vision or a multifocal lens. As illustrated in FIGURE 14, the lenticular strong power portion is shown at $w'$ and the carrier portion at $v'$.

Figure 15:
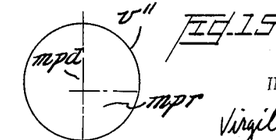

Major-reference-point: As used herein for the lenticular distance portion, the geometric center of the lenticular "strong power" disc; as used herein for the segment, a point about 2.5 mm. (standard displacement) nasalward from the vertical median line drawn through the major-reference-point of the distance portion, and about 4 mm. below the straight-top boundary of the segment, which segment major-reference-point coincides with central vision for reading. In FIGURE 15 the major reference point for the distance portion $v''$ is at $mpd$ and for the segment at $mpr$.

Figures 19A, 19B:
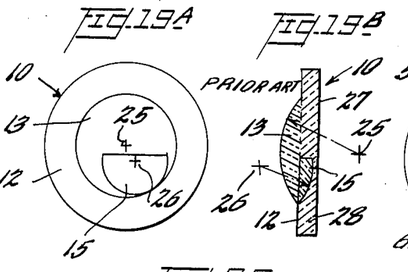
FIGURE 19A is a front view of a lens illustrating a prior attempt to reduce the thickness and weight of post-operative cataract lenses.
FIGURE 19B is a view in vertical central section of the lens shown in FIGURE 19A.

Referring now to FIGURES 19A and 19B wherein is illustrated a lens representing one prior attempt to provide a satisfactory post-operative cataract lens, the lens is indicated generally by the reference numeral 10 and is seen to comprise a peripheral annular area 12 with comparatively flat posterior and anterior faces, a central portion 13 having a quite pronounced anterior convexity, and a near vision or reading segment 15 made of glass having a different index of refraction than the other portions of the lens.

Figure 20:
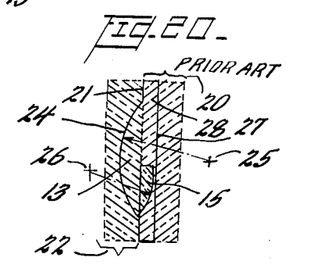
FIGURE 20 is a vertical sectional view through certain lens blank elements showing the manner of constructing the lens of FIGURE 19A.

Reference to FIGURE 20 of the drawings will reveal how the lens is made. First, there is provided a partially processed ordinary bifocal lens 20 having a polished anterior surface 21 into which is embedded the segment 15 of an index of refraction higher than that of the major lens portion 20. The center of curvature of the posterior surface of the segment insert 15 is at 26. Then a thick disc 22 having an index of refraction identical with that of the major lens disc 20, is fused or cemented to the polished surface 21 of the lens disc 20, after which the outer anterior portion of the disc 22 is grounded to a convex surface 24 of a relatively short radius centered at 25, this leaving the convex forwardly projecting portion of the compound lens designated 13 in FIGURES 19A and 19B. Then the necessary grinding of the posterior portion of the lens disc 20 is effected to produce the polished surface 27 of the proper prescription power for the patient's clear vision for distance.

However, this example embraced in FIGURES 19A, 19B and 20 of the drawings will always possess three marked disadvantages.

First, the reading segment 15 is embedded in the disc 20 and extends toward the posterior surface 27 of the lens and thus necessitates leaving the remaining portion 28 of the major lens part 20 thicker than desired in order that in the grinding of the posterior surface 27 the operation will not grind into the posterior surface of the reading segment 15.

Figure 21:
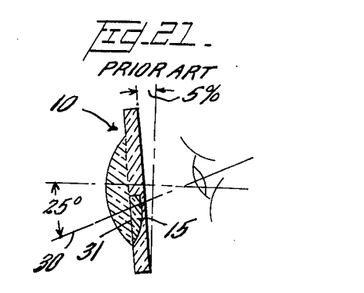
FIGURE 21 is a diagram showing the same lens in reading position and illustrating one of the disadvantages thereof.

A second disadvantage of the lens of FIGURES 19A and 19B is the relatively poor optical effect through the reading segment 15. This is graphically demonstrated in FIGURE 21 of the drawings which shows a ray of light 30 emanating from reading material or other close work and striking the anterior surface 31 of the reading segment 15 at an oblique angle. In this figure the natural tilt of the eyeglass lens from a vertical plane is indicated as being in the neighborhood of five degrees and the line of sight from the reading matter makes an angle of about twenty-five degrees with the horizontal. Thus the angle of incidence of one ray of light from the reading segment 15 is about twenty degrees. Anyone versed in the physics of light refraction will recognize the distortion of image which this will produce. It may be said that such type of lens construction produces an unwanted, unprescribed astigmatic effect when the patient reads through such a lens.

Figure 17A:
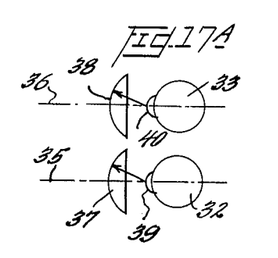
FIGURE 17A is a diagram showing the properly centered lens portions as required for post-operative cataract eyeglasses.

A third disadvantage of the lens shown in FIGURES 19A and 19B is the inability to incorporate in the reading portion of such a lens, a "base-in" (bases pointed nasalward) prismatic effect to aid the eyes to converge toward the point of close vision. In noncataract patients any need for aid to convergence is a rarity. In post-operative cataract prescriptions, however, the lenses are of such great power that they must be centered perfectly for the patient's eyes. Referring now to FIGURE 17A of the drawings, the eyes are indicated at 32 and 33 and the parallel lines of gaze are indicated at 35 and 36 when the eyes are directed toward distant objects. It will be noted that the centers of lenses 37 and 38 are on these lines of sight at 39 and 40 adjacent the corneas of the eyes. Then wearing the same prior art lenses in the positions proper for distant sight as shown in FIGURE 17A, when the patient attempts to converge the lines of sight to a point 42 of close vision, those lines appear as at 44 and 45 in FIGURE 17B, and those lines 44 and 45 must pass through the lenses 37 and 38 at points nasalward from the centers of the lenses at which abaxial or eccentric points there exists a prismatic effect "base-out," a pull against the attempts of the eyes to converge. Such pull in some instances is sufficient to cause the two eyes to fail to fuse the separate image impressions, the result being that the patient will see double. In the prior art lenses of FIGURES 19A and 20 the reading segments 15 do not alter the horizontal prismatic effect of the distance lenses at such eccentric points.

Figures 22A, 22B:
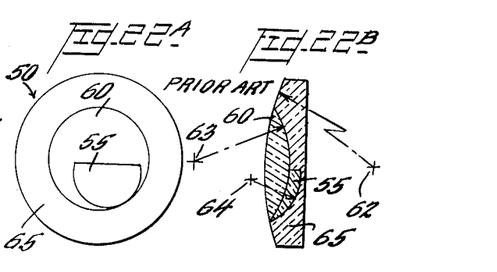
FIGURE 22A is a front view of a lens showing another prior attempt to overcome the difficulties in producing post-operative cataract lenses.
FIGURE 22B is a diagrammatic view in vertical section of the lens shown in FIGURE 22A.

In FIGURES 22A and 22B there is illustrated a lens 50 representing another attempt heretofore made to reduce the weight and thickness of a cataract lens. This lens might well be described in terms of the process of making it, with particular reference to FIGURE 23 of the drawings. A partially processed bifocal lens disc 51 is provided which has a concave anterior surface 52 into which is embedded a reading segment 55 of an index of refraction higher than that of the major lens disc 51. Then a lens disc 56 is prepared which has a high index identical to that of the reading segment 55 and which is ground with a convex posterior curve 58 which corresponds to the curvature of the concave surface 52 of the blank 51. The lens blanks 51 and 56 are now fused together along the surfaces 52 and 58 and there is then ground a new over-all convexly curved surface 59, and all that this leaves of the original blank 58 is the biconvex lenticular disc portion 60, which because of its high index, gives a greater distance-vision power than would have been furnished through a lens of the same curvature 59 but of a lower index of refraction. The center of curvature of the final anterior surface 59 is at 62, the center of curvature of the surface 52 is at 63, and the center of curvature of the posterior surface 57 of the insert 55 is at 64.

Figure 23:
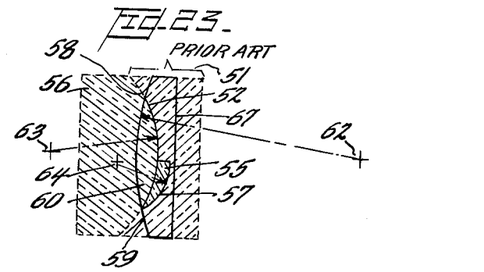
FIGURE 23 is a vertical sectional view of multiple blanks or discs showing the assembling and construction of the lens of FIGURE 22A.

Finally, the posterior surface 67 is ground to the prescription power for the patient's distance vision.

This results in the lens shown in FIGURES 22A and 22B at 50 where the remaining portion of the blank 51 is indicated at 65, the lenticular bi-convex portion formed from the blank 56 is represented at 60, and the close reading segment is shown at 55 as in FIGURE 23.

The prior art lens shown in FIGURES 22A and 22B possesses four disadvantages for the wearer. The first disadvantage is quite similar to the one discussed in connection with the effort represented in FIGURES 19A and 19B, namely, that the reading segment 55 extends toward the posterior surface of the lens and still requires the major lens portion 65 to be thicker than desired in order that the grinding of the posterior surface 67 does not spoil the ground surface 57 of the insert 55.

Figure 24:
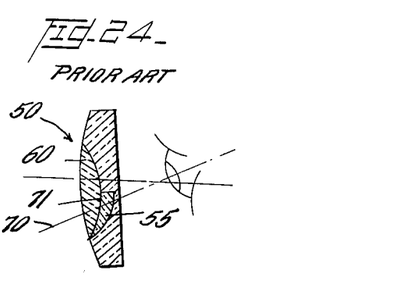
FIGURE 24 is a diagram pointing up the defects in the reading portion of the lens.

Two other disadvantages are quite similar to the one discussed in connection with FIGURES 19A and 19B, namely, that of giving a poor optical effect. As shown in FIGURE 24, the ray of light 70 emanating from reading material or other close work strikes the anterior surface 71 of the reading segment 55 at an extremely oblique angle. Being even greater than the twenty degree angle suggested in FIGURE 21 of the drawings, the reading segment 55 in FIGURE 24 produces more distortion and unwanted astigmatic effect.

Figure 17B:
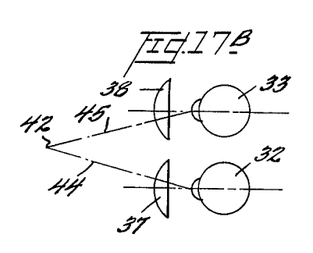
FIGURE 17B is a similar diagram illustrating the necessity of providing base-in prismatic effects for near-vision or reading in such lenses to prevent the tendency toward double vision.

A third disadvantage of the lens shown in FIGURES 22A and 22B is the same one relating to convergence already described in connection with FIGURES 19A and 19B by reference to FIGURES 17A and 17B of the drawings.

A further disadvantage of the lens of FIGURES 22A and 22B resides in the fact that, while a higher index disc 60 does furnish some extra power over a lens of the same anterior and posterior curves but of a lower index, the lens possesses more total glass volume and more of the heavier index glass, than does the lens shown in FIGURES 19A and 19B, and therefore the eyeglass lenses following this procedure weigh considerably more and exert a more uncomfortable pressure upon the thin skin of the patient's nose.

Now with these defects of prior art attempts to solve the problem of furnishing satisfactory post-operative cataract lenses in mind, the present invention will now be understood as explained and described in connection with FIGURES 25A to 33 of the drawings.

Figure 25A:
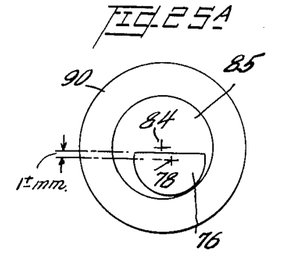
FIGURE 25A is a front view of a lens embodying the principles of the present invention in probably its simplest terms.
Figure 25B:
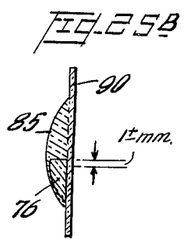
FIGURE 25B is a vertical sectional view through the lens of FIGURE 25A.
Figures 27A, 27B:
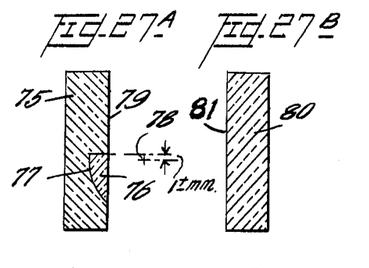
FIGURES 27A and 27B, respectively, show two lens blanks which go to make up the lens of the present invention.
Figure 28:
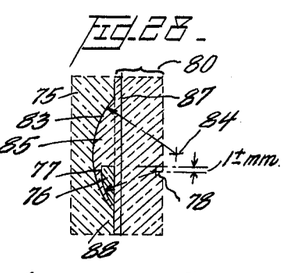
FIGURE 28 illustrates the fusing and grinding of the two blanks to form the novel lens.

Again, it will be convenient to describe the novel lens shown in FIGURES 25A and 25B by reference to the process of making it and for this purpose reference is first made to FIGURES 27A, 27B and 28 of the drawings.

First, the principal blanks from which the lens is constructed are shown in FIGURES 27A and 27B of the drawings. There is represented at 75 a partially processed bifocal lens disc having embedded therein a reading segment 76 of a higher index of refraction than the main disc 75. The anterior surface 77 of the reading segment is centered at 78. The polished posterior surface 79 of the disc 75 is pictured as flat or planar, but it may be convex or preferably even slightly concave, inasmuch as a concave posterior surface 79 would be accompanied by a more convex anterior surface 77 with a still shorter radius than shown centered at 78.

The lens disc 80 may be of either clear glass or colored glass, regardless of whether the component 75 is of clear or colored glass, and generally but not necessarily, the part 80 will have the same index of refraction as the disc 75. The polished anterior surface 81 of the disc 80 matches the polished posterior surface 79 of the part 75 and these two surfaces are subsequently fused together as shown in FIGURE 28 of the drawings.

Then, the central portion of the anterior surface of the component 75 is ground to the curvature indicated at 83 and centered at the point 84, this curvature being of a relatively short radius and the grinding of the surface 83 resulting in the convex lenticular portion 85.

Then the disc portion 80 is ground to the posterior surface 87 to the prescribed power needed for the patient's distant vision, and the remaining annular anterior surface of the lens represented at 83 is ground approximately parallel to the surface 87, shown as flat but usually concave.

It is to be particularly noted that the placement of the reading segment 76 within the confines of the lens portion or disc 85 permits the remainder of the lens to be ground as thin as desired. Thus, in the final lens as shown in FIGURES 25A and 25B the major central convex portion for post-operative cataract purposes is shown at 85, the peripheral portion of the lens at 90, and the close or reading segment at 76.

Figure 26:
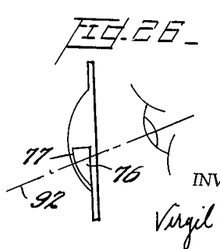
FIGURE 26 is a diagram showing the improved optical effect of the novel lens for reading purposes or other close work.

Referring now to FIGURE 26 of the drawings, it will be seen that the ray of light reflected from the reading matter or other close work indicated at 92 strikes the anterior surface 77 of the reading segment 76 approximately normal or perpendicularly to that surface, thereby reducing drastically the usual distortion and astigmatic effect heretofore common to all other attempts to make a thin light-weight cataract lens.

Figure 29A:
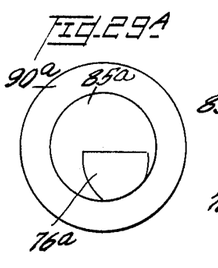
FIGURE 29A is a front view of a lens comprising another embodiment of the present invention, having a segment decentered to produce prismatic base-in effect.
Figure 29B:
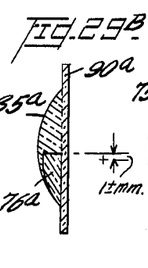
FIGURE 29B is a vertical sectional view through the lens of FIGURE 29A.

Now proceeding from this elementary disclosure, the real gist of the invention may be gleaned from FIGURES 29A and 29B in which there is shown a lenticular cataract multifocal lens having a base-nasalward or base-in prism-segment free of any wall or shoulder, but with a feather-edge at the base of the nasal boundary of the prism-segment and designed to furnish binocular centered vision for reading of close work, which will result in the maximum binocular efficient use of the reading area together with a comfortable convergence of the eyes in reading. In these figures the peripheral portion of the distance lens area is designated 90a, the convex central lens portion 85a, and the reading segment 76a decentered nasalward to produce a base-in prismatic effect.

Figures 30A, 30B:
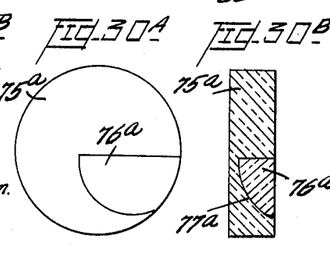
FIGURES 30A and 30B comprise, respectively, a front view and a vertical sectional view of an anterior component of said embodiment of the invention.
Figure 30C:
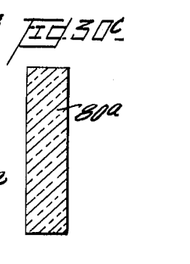
FIGURE 30C is a blank comprising the complementary posterior portion of the lens.

In FIGURES 30A and 30B there is shown the lens blank 75a having the reading segment insert 76a embedded therein with the convex surface 77a facing forwardly and extending toward the lower right-hand quadrant of the disc as clearly shown in FIGURE 30A. The posterior disc or blank 80a is shown in FIGURE 30C and does not differ from the corresponding blank illustrated in FIGURE 27B.

Figure 31A:
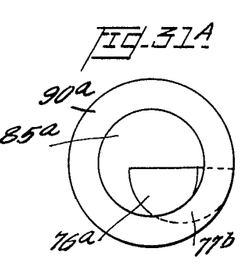
FIGURES 31A and 31B are, respectively, a front view and a vertical sectional assembly view of the components of the lens using the parts shown in FIGURES 30A, 30B and 30C.
Figures 31B, 32:
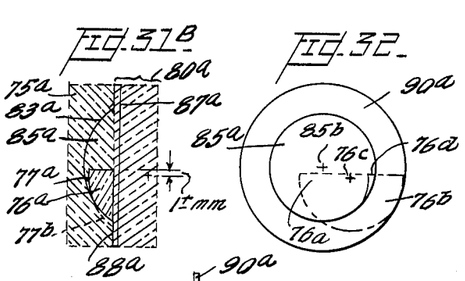
FIGURE 32 is a view in front elevation of an eyeglass lens similar to those shown in FIGURES 29A and 31A.

In FIGURES 31A and 31B there is illustrated a multifocal lens and method of making it, which method is quite similar to the one illustrated in FIGURE 28 with the exception of the grinding of the convex surface 83A of the lens portion 85a adjacent the insert 76a. It will be noted from an inspection of both FIGURES 31A and 31B that the lower right-hand portion of the insert 76a is ground away during the grinding of the convex anterior surface 83a of the lens 85a. The portion 77b bounded by the broken line, is completely ground away leaving only that area of the reading segment 76a which remains included within the lens portion 85a. This method of construction has a distinct advantage over prior proposals, such as those illustrated in FIGURES 19A and 22A of the drawings, since if an attempt were made to attain a prismatic effect by extending the reading insert nasalward, this would increase the weight and thickness of the posterior portions of those lenses intolerably. It would also mean that part of the reading insert would be visible within the area of the carrier disc.

Figures 18A, 18B:
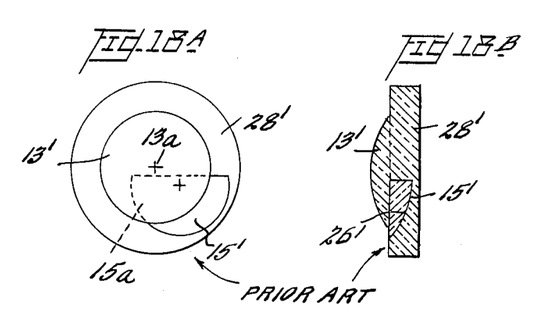
FIGURES 18A and 18B are views in front elevation and vertical section respectively, of an eyeglass lens with the prism-segment of the necessary size embedded within the carrier lens portion as in the lens shown in FIGURES 19A and 19B.

Thus in FIGURES 18A and 18B the carrier disc is represented at 28', the segment at 15' and the lenticular portion 13' centered at the point 13a. The portion 15a within the dotted boundaries is that part of the segment 15' which lies buried within the carrier disc beneath the lenticular strong power portion 13'. These figures illustrate clearly what a prism-segment would look like if made in accordance with the prior art methods illustrated in FIGURES 19A, 19B and 20 of the present drawings.

Reverting again to the arrangements in FIGURES 29A and 31A, reference is also made to FIGURE 32 where it is indicated that a very slight exposure of boundaries of the segment may occur. In FIGURE 32 the buried segment portion 76a is indicated by dotted lines and the ground-away portion 76b suggested by the broken lines, while the only exposed boundaries are shown to the right-hand side of the residual segment in solid lines. Also the depression of the flat top of the segment below the center 85b of the lens portion 85a is indicated as being in the neighborhood of 1.5 mm. and the distance from this flat top down to the center point 76c of the segment is approximately 1 mm. Also it is to be noted that the lateral distance between the centers, in this particular example, is approximately .7 mm. With these conditions, the width of the small exposed top line 76d of the segment is approximately 1.5 mm.

Figure 33:
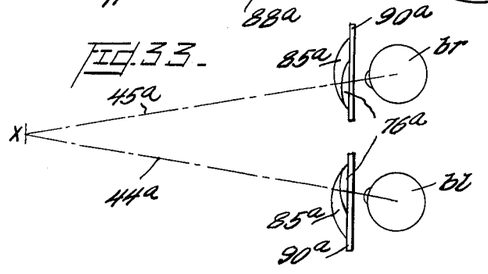
FIGURE 33 is a diagram somewhat similar to FIGURE 17B illustrating the appropriate prismatic effect of the improved lens comprising the present invention.

In FIGURE 33 there is illustrated the improved centered vision prismatic effect provided by the present invention with bases nasalward as depicted in FIGURES 29A and 31A, the converging lines of sight being indicated at 44a and 45a. The object to be viewed is again indicated at x, the right eye at br and the left eye at bl. The carrier portion of the lens is indicated at 90a, the lenticular distance portion at 85a and the reading insert at 76a in the case of both glasses. It will be noted that the reading segments are centered with respect to the lines of sight, that is the lines 44a and 45a cut through the anterior surface of the segments 76a at a midpoint between the temporal edge of the segment and the exposed border of the segment first reached in shifting the gaze laterally. The amount of exposed higher-index glass is of very small extent and negligible in producing any difficulties in reading vision, especially when the feather-edge nature of the boundary is taken into consideration.

At this point it might be well to discuss some prior art developments for non-lenticular cataract prescription lenses. Even though reading centrally through these prism-segment reading portions, the wearer receives the distracting effect of reading through a shiny tube, on the nasal side of the reading portions.

With a base-in reading-segment-prism of the prior art mentioned as weak as 0.75Δ (when the wearer is seated reading, with the illumination coming from the side or even out 90 degrees toward the front), to the wearer the the nasal "wall" of the reading field gives the illusion of reading through a shiny tube about three-quarters of an inch long, although the 0.75Δ nasal "wall" measures only about 2 mm. In such illusion of "reading through a shiny tube" the "tube" seemingly is projected mentally to a point almost half-way to the reading material.

If those reading-segment-prisms were twice as strong, the "wall" would be almost 50% thicker.

In contrast, in the present invention there is no "wall" at either end (neither nasal nor temporal end) of the reading portion, which segment at each end is feather-edged to zero in thickness, with the nasal end-boundary of the present invention's reading portion no more noticeable to the wearer than would be the boundary of the weakest-powered conventional, ordinary bifocal's reading portion.

Figure 16:
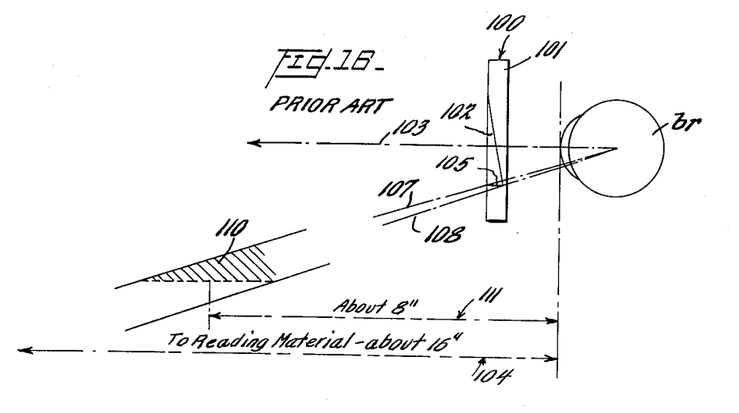
FIGURE 16 is a diagram in a transverse plane containing both eyes and the object viewed, and illustrating the deleterious effect of certain prior art lenses.

As illustration of this phenomenon, in FIGURE 16 there is shown diagrammatically this unpleasant interfering "wall" fault. The right eye of the observer is illustrated at br and a lens illustrative of the "prism-segment" bifocal of these prior art devices is indicated at 100, the distance portion being diagrammatically suggested at 101 and the reading segment at 102. The straight-ahead reading vision line of sight is shown by the line 103 and for purposes of illustration it is assumed that the reading material is disposed at a distance of about 16 inches from the eye as suggested by the line 104. The abrupt boundary 105 of the reading portion 102 "blanks out" a portion of the area of vision adjacent this boundary as between the lines 107 and 108 giving rise to the appearance of an area 110, occurring at a distance of approximately 8 inches (along dimension line 111), of the illusion of looking through a shiny tube mentally projected to seem to appear at a distance of about 8 inches from the eye (see line 111). This is in vivid contrast to the applicant's feather-edge provisions as illustrated and described above.

Certain of the more important features of novelty of the present invention may be summarized as follows:

(1) The provision by the present invention of the lenticular multi-focal prism-segment which permits *centered vision* for reading or close work.

(2) A base-in prism-segment which permits centered vision without a "wall" or "shoulder" at the nasal margin of the prism-segment.

(3) A base-in prism-segment with a feather-edge at the nasal boundary of the segment and which permits centered vision.

(4) In the present invention, the amount of base-in prismatic effect in the segment is varied by varying the measurement from the major-reference-point of the segment to the optical-center of the segment. The greater that measurement, the greater is the base-in prismatic-effect for any given magnifying power. Centered vision is furnished for any given power of magnification and base-in prismatic-effect by the selection of the proper horizontal diameter of the anterior surface of the reading segment such as at 77a in FIGURE 30B. Incidentally, it may be stated that the importance to the wearer, of centered vision in multifocal lenses is indicated by the extensive discussion of the necessity for centered vision at close work, in chapter 5 of the textbook "Prescribing for a Patient's Different Visual Needs," published by the California Optometric Association's Visual Care Promotion Committee.

(5) In the present invention, dependent upon the amount of magnifying power, the amount of prescribed base-in prismatic effect, and the chosen horizontal diameter of the anterior surface 77a (FIG. 30B) of the reading segment, there may be a bit of the higher-index segment glass exposed at its extreme nasal boundary within the lenticular "strong-power" portion of the multifocal. That amount of exposed higher-index glass may measure as little as 1 mm. in horizontal dimension, up to a possible maximum of 6 mm.

Assuming a 6 mm. maximum exposed higher-index glass, the fact that the total lens power through that exposed portion always is somewhat less than the total lens power through the reading area, but that the total lens power through the exposed portion always is greater than the distant vision power, will mean that, should the wearer's line-of-sight pass through that exposed portion, the wearer will experience a far less abrupt change in lens power or blur and far less confusion than he would have experienced with either an ordinary bifocal or a prism-segment bifocal which had a "wall" at its segment's nasal boundary. With either an ordinary bifocal or a prism-segment "wall" bifocal, there would have been the maximum abruptness in change of lens power from that of reading to that of distance power.

In all of these discussions of "base-in" prism effects, it should be borne in mind that binocular vision is under consideration and not conditions where the wearer would use only one eye. The prism base-in effect is a matter of yoked vision and there exists the same net prismatic effect between the two eyes as the wearer sweeps his eyes from left to right.

Since it is rather obvious that the posterior surfaces of the distant-vision disc and of the near-vision segment, in such post-operative eyeglass lenses, are generally either flat or concave (it would be a rare case in which they were actually convex) and the anterior surfaces of these lens parts are always convex, it is sufficient to refer to this condition in the claims by characterizing these lens parts as of positive power.

Although illustrated by embodiments comprising bifocal lenses, it is understood that the principles of the invention apply equally well to trifocal or other multifocal lenses.

It is also understood that various changes and modifications may be made in the embodiments illustrated and described herein without departing from the scope of the invention as determined by the following claims.

Having thus described the invention, what is claimed as new and desired to be secured by Letters Patent is:

1. A multi-focal lens for use in eyeglasses for post operative cataract patients, comprising a distant-vision disc of relatively high power to compensate for the loss of the crystalline lens of the patient's eye, said distant-vision disc having a substantially concave cavity in its posterior surface, a near-vision segment embedded in said cavity and having a convex anterior surface of mating curvature with respect to the wall of said cavity and in intimate contact therewith, said distant-vision disc being anteriorly convex and of positive power and said near-vision segment being of a higher index of refraction than said distant-vision disc, and a carrier disc having its anterior surface mating with the posterior surface of said distant-vision disc and said segment and unitarily secured thereto; said near-vision segment also being of positive power, the optical center of said near-vision segment being de-centered nasalward with respect to the optical center of said distant-vision disc a sufficient distance to produce a base-in prismatic effect for the greater portion of the horizontal reading scope thereof including the point in the segment through which passes the central vision reading line of sight, and the anterior interface convex horizontal curve of said near vision segment intersecting the anterior convex horizontal curve of the distant-vision disc to form an exposed feather edge at the nasalward side of the segment.

2. The multi-focal lens as set forth in claim 1 in which said near-vision segment has a flat top, and the curvature of said segment is such that any vertical element thereof is intersected by the line of sight at substantially right angles.

3. The multi-focal lens as set forth in claim 1 in which the curvature of the near-vision segment is such that any vertical element thereof is intersected by the line of sight at substantially right angles and the near-vision area is centered as to the sweep of reading vision of the eye to right and left.

4. A multi-focal lens for use in eyeglasses for post-operative cataract patients, comprising a distant-vision disc of relatively high power to compensate for the loss of the crystalline lens of the patient's eye, said distant-vision disc having a substantially concave cavity in its posterior surface, a near-vision segment embedded in said cavity and having a convex anterior surface of mating curvature with respect to the wall of said cavity and in intimate contact therewith, said distant-vision disc being anteriorly convex and of positive power and said near-vision segment being of a higher index of refraction than said distant-vision disc, and a carrier disc having its anterior surface mating with the posterior surface of said distant-vision disc and said segment and unitarily secured thereto; said near-vision segment also being of positive power, the optical center of said near-vision segment being de-centered nasalward with respect to the optical center of said distant-vision disc a sufficient distance to produce a base-in prismatic effect for the greater portion of the horizontal reading scope thereof including the point in the segment through which passes the central vision reading line of sight, the anterior convex horizontal curve of the distant-vision disc intersecting at spaced points both the anterior and posterior surfaces of the otherwise totally enclosed near-vision segment at the nasalward side thereof, the intersection with the anterior surface of said segment providing an exposed feather edge obviating any vision-interfering shoulder at such point.

5. A multi-focal lens for use in eyeglasses for post-operative cataract patients, comprising a distant-vision disc of relatively high power to compensate for the loss of the crystalline lens of the patient's eye, said distant-vision disc having a substantially concave cavity in its posterior surface, a near-vision segment embedded in said cavity and having a convex anterior surface of mating curvature with respect to the wall of said cavity and in intimate contact therewith, said distant-vision disc being anteriorly convex and of positive power and said near-vision segment being of a higher index of refraction than said distant-vision disc, and a carrier disc having its anterior surface mating with the posterior surface of said distant-vision disc and said segment and unitarily secured thereto; said near-vision segment also being of positive power, the near-vision area afforded by the embedded segment being centered as to the sweep of vision to the right and left, the optical center of said near-vision segment being de-centered nasalward with respect to the optical center of said distant-vision disc of sufficient distance to produce a base-in prismatic effect for the greater portion of the horizontal reading scope thereof including the point in the segment through which passes the central vision reading line of sight, the anterior convex horizontal curve of the distant-vision disc intersecting at spaced points both the anterior and posterior surfaces of the otherwise totally enclosed near-vision segment at the nasalward side thereof, the intersection with the anterior surface of said segment providing an exposed feather edge obviating any vision-interfering shoulder at such point, all whereby, when a pair of said lenses are assembled in an eyeglass, the right and left near-vision segments for substantially their entire widths, together yield for yoked vision a substantially constant net base-in value at all points horizontally of the segment.

References Cited by the Examiner

UNITED STATES PATENTS

| | | | |
|---|---|---|---|
| 625,535 | 5/1899 | Borsch | 88—54 |
| 2,125,056 | 7/1938 | Tillyer | 88—54 |
| 2,388,687 | 11/1945 | Hammon | 88—54 |
| 2,517,609 | 8/1950 | Tillyer | 88—54 |
| 2,518,099 | 8/1950 | Tillyer | 88—54 |
| 2,885,828 | 5/1959 | Emerson | 65—38 |

OTHER REFERENCES

Benson Optical Co., advertisement in "Journal of the American Optometric Association," volume XXII, No. 1, August 1950, page 62, RE 1. A56.

Fonda: "Binocular Corrections for Low Vision," article in "American Journal of Ophthalmology," volume 45, No. 1, January 1958, pages 23–27, RE 1.A5.

DAVID H. RUBIN, *Primary Examiner.*